United States Patent [19]

Leitgeb

[11] Patent Number: 4,494,049
[45] Date of Patent: Jan. 15, 1985

[54] COMMUTATING DEVICE FOR AN ELECTRIC MOTOR SUPPLIED FROM A D-C VOLTAGE SOURCE

[75] Inventor: Wilhelm Leitgeb, Bad Neustadt, Fed. Rep. of Germany

[73] Assignee: Siemens Aktiengesellschaft, Munich, Fed. Rep. of Germany

[21] Appl. No.: 425,907

[22] Filed: Sep. 28, 1982

[30] Foreign Application Priority Data

Oct. 23, 1981 [DE] Fed. Rep. of Germany ....... 3142142

[51] Int. Cl.³ .......................................... H02K 23/00
[52] U.S. Cl. .................................. 318/138; 318/254; 363/132
[58] Field of Search ............... 363/17, 132, 97, 98, 363/21, 56, 134; 323/280; 318/138, 254

[56] References Cited

U.S. PATENT DOCUMENTS 4,047,081  9/1977  Liska .
4,310,866  1/1982  Wirth ............................. 363/132 X
4,330,819  5/1982  Foch .............................. 363/132
4,336,587  6/1982  Boettcher ...................... 363/134
4,370,701  1/1983  Western ....................... 363/56 X
4,374,347  2/1983  Müller .......................... 318/138

Primary Examiner—J. V. Truhe
Assistant Examiner—Patrick Keane
Attorney, Agent, or Firm—Kenyon & Kenyon

[57] ABSTRACT

In a commutating device for an electric motor which is supplied from a d-c voltage source, which includes semiconductor switching elements arranged in a bridge circuit and addressed by means of a control voltage in dependence on the rotor position of the motor, in order that the semiconductor switching elements can be addressed without transformers and without separate control voltage sources, the residual voltage dropping across the load circuit of the semiconductor switching elements and/or the inverse voltage stored in the respectively preceding cut-off phase is used as the control voltage.

1 Claim, 2 Drawing Figures

COMMUTATING DEVICE FOR AN ELECTRIC MOTOR SUPPLIED FROM A D-C VOLTAGE SOURCE

BACKGROUND OF THE INVENTION

This invention relates to electrical motors in general and more particularly to a commutating device for an electrical motor supplied from a d-c voltage source, which comprises semiconductor switching elements arranged in a bridge circuit which are addressed by a control voltage in dependence on the rotor position.

Such a commutating device is described in U.S. Pat. No. 4,047,081. Because the transistors of this commutating device are connected in a bridge circuit, their bases are at different potentials. It is therefore, necessary to connect the control voltage to the bases of the transistors with the interposition of transformers or to provide several control voltage sources which have no potential relative to each other.

It is an object of the present invention to develop a commutating device of the type described above in which the semiconductor switching elements can be controlled without transformers and without separate control voltage sources.

SUMMARY OF THE INVENTION

The solution of this problem is accomplished by using the residual voltage dropping at the load circuit of the semiconductor switching elements and/or the inverse voltage stored in the respectively preceding cut-off phase as the control voltage.

DETAILED DESCRIPTION

Figure 1:
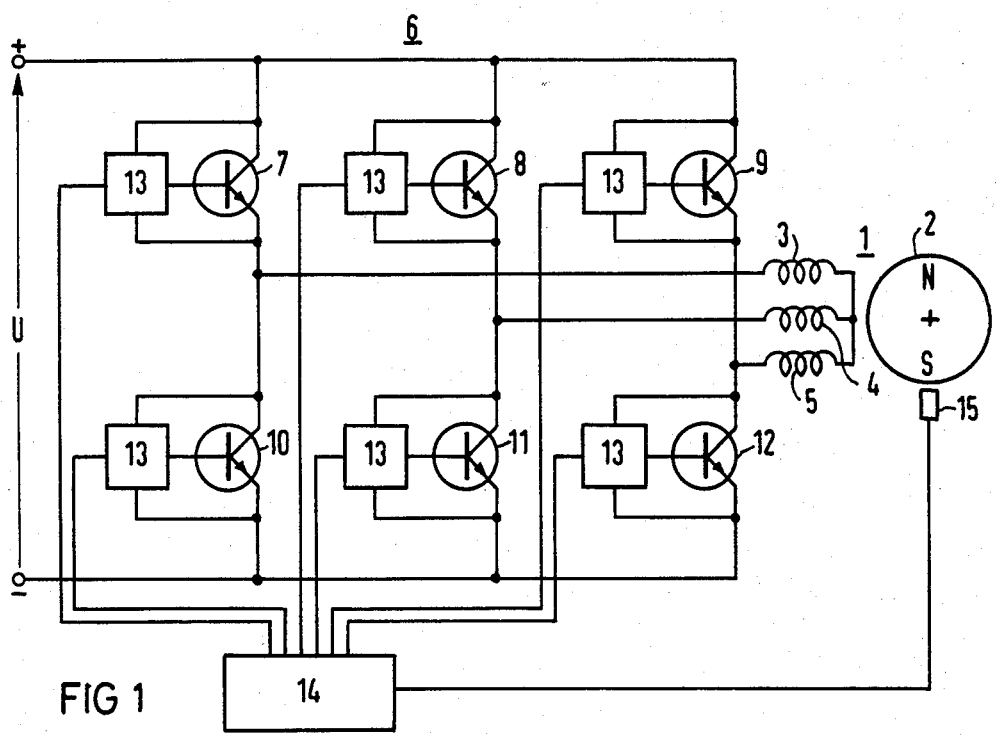
FIG. 1 shows a complete commutating device.

In FIG. 1, a motor 1, having a permanent magnet excited rotor 2 and three stator winding legs 3 to 5 is illustrated. The three stator winding legs 3 to 5 are connected to a commutating device 6. This commutating device 6 consists of main transistors 7 to 12 arranged in a bridge circuit. The main transistors 7 to 9 form the one half of the bridge and the main transistors 10 to 12 the other half of the bridge. The commutating device 6 is connected across a d-c voltage source U.

Associated with each of the main transistors 7 to 12 is a control unit 13, which has its supply input and output connected across the collector-emitter path of the respective transistor and has its control input connected to the base of the associated transistor. The control input of each control unit 13 is connected to a control circuit 14 which works in dependence on a rotor position pickup 15. The control units 13 therefore obtain their respective drive signals in an order depending on the rotor position.

The control units 13 take the control voltage required for driving the main transistors 7 to 12 from the load circuit of the main transistors 7 to 12. The voltage applied to the control unit which is thereby available for controlling the main transistors 7 to 12 varies approximately between the applied d-c voltage U and the residual collector-emitter voltage of the main transistors. Since the residual collector-emitter voltage increases with decreasing base current, it increases until a natural equilibrium adjusts itself. This can result in a relatively large voltage drop at the collector-emitter path, which leads to correspondingly high losses. For this reason, it is advantageous to reduce the inverse voltage present during a preceding cut-off phase via a series regulator and to store it in a capacitor.

Figure 2:
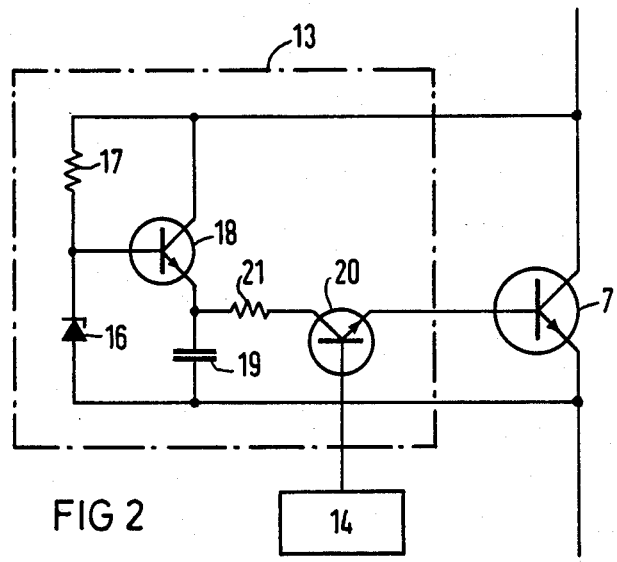
FIG. 2 is a circuit diagram of an embodiment of a control unit according to the present invention.

Such a series regulator is shown in FIG. 2. The collector-emitter path of the respective main transistor, for instance, 7 is shunted by a series circuit consisting of an ohmic resistor 17 and a Zener diode 16 as well as a series circuit formed by a auxiliary transistor 18 and a capacitor 19. The base of the auxiliary transistor 18 is connected to the common connecting point of the ohmic resistor 17 and the Zener diode 16. The common junction point of the emitter of the auxiliary transistor 18 and the capacitor 19 is connected via a control resistor 21 and an electronic switching element 20 to the base of the corresponding main transistor.

The series regulator operates as follows: During the cut-off phase of the respective main transistor, the auxiliary transistor 18 is switched into conduction with the Zener voltage dropping at the Zener diode 16 and the capacitor is charged up thereby. The capacitor 19 is charged until its voltage has reached the magnitude of the Zener voltage and the auxiliary transistor 18 is cut off thereby. The capacitor voltage is thus limited to the magnitude of the Zener voltage. The electronic switching element 20 is controlled by the control circuit 14 which in turn is addressed in dependence on the rotor position pickup 15. When the electronic switching element 20 is switched into conduction, the connected main transistor is switched on and kept in the conducting state until the electronic switching element 20 is cut off again.

The energy required for switching the main transistors into conduction is therefore taken from the capacitor 19 in the control unit 13 shown in FIG. 2. It is particularly advantageous here to use transistors which require little control power (MOS FET transistors) as main transistors 7 to 12. If such main transistors with low control power are used, correspondingly low capacity values are required for the capacitors 19 built into the control units 13.

What is claimed is:

1. A commutating device for an electric motor comprising:
    (a) a plurality of transistor switches each having two switching terminals and a control terminal arranged in a bridge circuit;
    (b) means for detecting rotor position and developing an output signal corresponding thereto;
    (c) means for generating from said outputs signal a control signal for each transistor switch; and
    (d) a control circuit associated with each transistor coupled across said two switching terminals to obtain therefrom a control voltage, said control circuit receiving one of said control signals and responsive thereto to couple said control voltage to the control terminals of said transistor, said control circuit comprising:
        (i) a voltage regulator for regulating the control voltage obtained from across said terminals;
        (ii) a capacitor for storing said voltage; and
        (iii) a further transistor for coupling said capacitor voltage to said control terminals in response to a control signal.

* * * * *